Nov. 25, 1947.  L. T. SACHTLEBEN  2,431,424
MEASUREMENT OF RESOLVING POWER OF SCHMIDT TELESCOPES
Filed Dec. 28, 1943  2 Sheets-Sheet 1
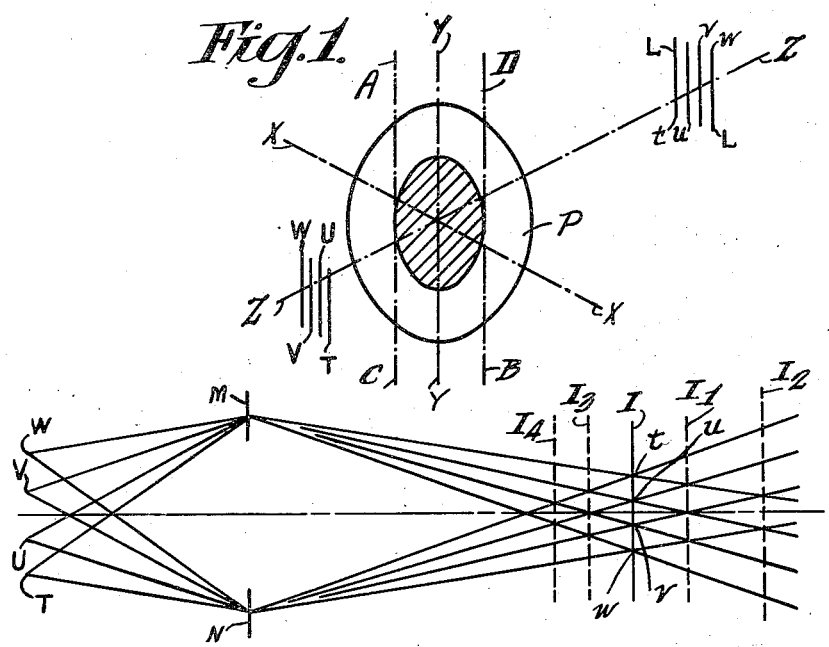
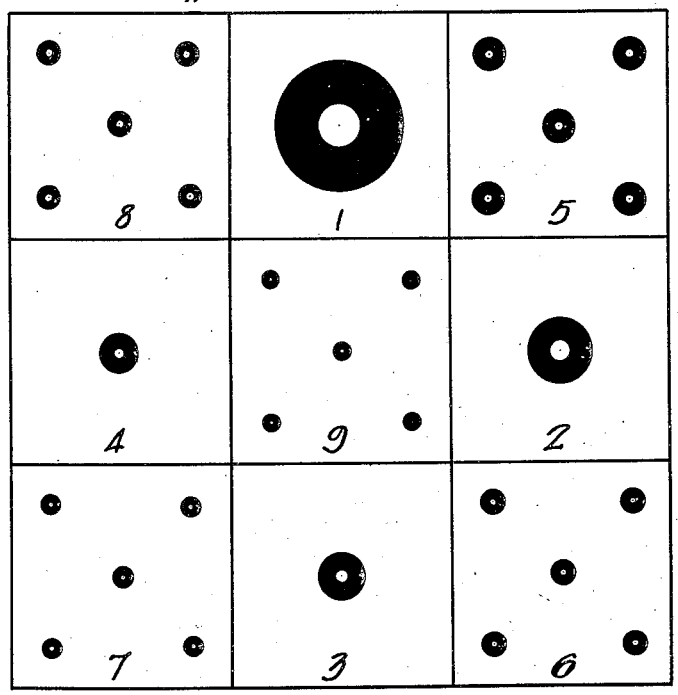
INVENTOR.
Lawrence T. Sachtleben
BY
ATTORNEY Patented Nov. 25, 1947

2,431,424

UNITED STATES PATENT OFFICE 2,431,424

MEASUREMENT OF RESOLVING POWER OF SCHMIDT TELESCOPES

Lawrence T. Sachtleben, Indianapolis, Ind., assignor to Radio Corporation of America, a corporation of Delaware Application December 28, 1943, Serial No. 515,881

3 Claims. (Cl. 88—56)

This invention involves a method of testing Schmidt telescopes or other optical devices using an annular objective. There are various methods of testing optical instruments which are adapted for use with circular objectives but which are totally unsuited for testing optical instruments with annular objectives such as the Schmidt telescope, for example. Some of these methods of testing may be used in the laboratory and with appropriate laboratory precautions accompanying their use, but are totally unsuited for production tests of such apparatuses with comparatively unskilled personnel. This is particularly true with methods utilizing test objects consisting of substantially parallel lines, which is the most usual form in use.

In the present invention a chart is made of such size that when viewed through a collimator it fills the field of view of a Schmidt telescope. This chart is divided into small square units each of which contains detail in a range of sizes, the detail consisting of an annular figure whose outside diameter is three times the inside diameter. A figure is considered to be resolved when it is seen to have a center and does not appear as simply a solid dot which displays no structure within itself. The resolving power of the telescope will be two-thirds of the angular diameter of the smallest annulus resolved in any given part of the field. By angular diameter is meant the angle subtended at the pupil of the optical instrument by the external diameter of the resolved annulus.

One object of the invention is to provide an improved method for testing optical instruments with annular objectives.

Another object of the invention is to provide a method of directly determining the resolving power of optical instruments.

Another object of the invention is to provide a method of directly determining the resolving power of optical instruments with annular objectives.

Other and incidental objects of the invention will be apparent to those skilled in the art from a reading of the following specification and an inspection of the accompanying drawings in which:

Figure 1 is a diagrammatic view of an optical instrument having an annular objective set for testing with parallel lines.

Figure 2 is a diagram of the images formed of the parallel lines in an arrangement as illustrated in Fig. 1.

Figure 3 is an illustration of one element of my improved test object, and

Figure 4:
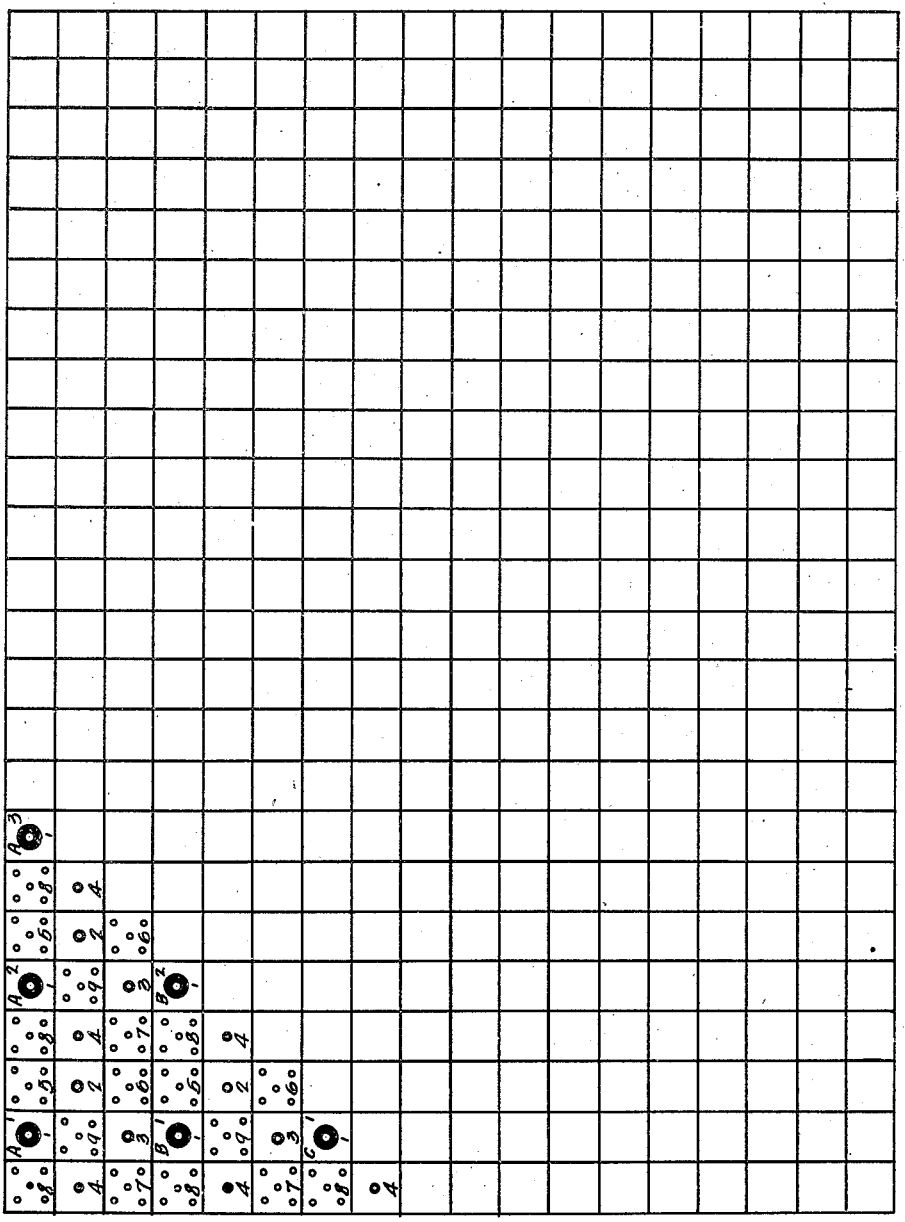
Figure 4 is an illustration of a screen composed of a plurality of such test objects.

Parallel line patterns are frequently used to test the resolving power of optical systems. Such a parallel line pattern is illustrated for example in "Some television problems from the motion picture standpoint," (G. L. Beers, E. W. Engstrom, and J. G. Maloff) J. S. M. P. E., XXXII (Feb. 1939), p. 121. Line patterns do not become wholly unresolved when an optical system imaging them goes out of focus but for certain out-of-focus conditions the line pattern reappears, though not as well defined as when in sharp focus. When the optical system has an annular pupil as in the Schmidt telescope the angle of convergence of the extreme opposite edge rays may be large while for a small sector of the annulus the angle of convergence of the edge rays may be rather small. For example, in one type of Schmidt telescope for ultimate visual observation the convergence of the extreme edge rays from opposite sides of the annular aperture is about 86°, while the extreme edge rays from a small sector of the annulus converge at an angle of about 18°. The depth of focus of the whole aperture is therefore far less than that of a limited sector of the aperture.

Referring now to Fig. 1, if P represents an annular exit pupil of an optical system having an annular objective in the XY plane, while a pattern of parallel lines T, U, V, and W is imaged on the optical axis ZZ at LL as $t$, $u$, $v$, and $w$ in a plane parallel to XY by the optical system, it will be apparent that the segments of the annulus cut off by the lines AC and BD constitute the major portion of the area of the pupil and the pupil is, in first approximation, equivalent to two long slots parallel to AC and BD in positions corresponding to those of the segments defined above. The depth of focus of either slot alone for the lines parallel to its long dimension is great, but for the two together is very small. The result is that if a screen receiving the parallel line image at LL is moved toward or away from the plane of the true image the lines first go out of focus and then are brought into focus almost but not quite as sharply as before.

Referring now to Fig. 2, M and N represent the narrow dimensions of the two parallel slots referred to in connection with Fig. 1 as defined by AC and BD. True images of the lines will be formed in the image plane I at $t$, $u$, $v$ and $w$. The lines drawn from the centers of the slots M and N to each of the lines T, U, etc. are principal rays, there being two for each line T, U, V and W in the object plane corresponding to one of the lines $t$, $u$, $v$, and $w$ in the true image. In the true image plane I, the two principal rays from a line T through M and N intersect in the line $t$. The same relation holds between each of the other lines in the object plane and the corresponding line in the image plane. If we shift from the plane I to the plane $I_1$, it is seen that the principal ray from T through M intersects the principal ray from U through N, and that from U through M intersects that from V through N, etc. Since the lines in the object space are regularly spaced the images reappear at $I_1$ and when the focal depths of M and N are great the false image at $I_1$ may be almost as good as that at I. In a plane midway between I and $I_1$, the lines will be definitely out of focus and not resolved. False images also occur at $I_2$, $I_3$ and $I_4$ for the same reasons.

The image of a Schmidt telescope lies on a spherical surface and must therefore be received on a spherical photographic plate, light responsive surface or diffusing screen, or must be viewed with an eyepiece especially designed for such a spherical image surface. In testing a Schmidt telescope the image is received on a spherical diffusing screen and viewed with a microscope. The quality is judged largely by the fineness of detail resolved in the image. It is readily seen from the foregoing that a flaw in the curvature of the image may occur without seriously affecting the apparent resolution of the finest parallel line detail in certain parts of the field. In such a case where the image is obviously faulty but the finest detail is still resolved, it is most difficult to interpret the results and therefore a parallel line system or a test object having the same characteristics as to image formation is impractical for commercial use.

I have accordingly devised a test object and method of testing which is completely devoid of the aforementioned difficulties. This test object is shown in Fig. 3 and comprises a series of annuli of varying diameters. This particular test object uses nine different diameters of annuli—the largest, 1, being of such size that it is easily resolved by any except the most faulty optical system being tested, the second, 2, being of half that size, the third, 3, being of one-third that size, etc. As indicated above, an annulus is resolved when the center is apparent and the resolving power is two-thirds of the angular diameter of the smallest annulus resolved so that with each two successive diameters of annulus being in the ratio of the reciprocals of their order numbers, the order number provides a direct measure of the resolving power of the instrument. As indicated above, the diameter of the center is one-third of the external diameter of the annulus. The test object of Fig. 3 is in its present form made in the form of a square about 5¾" on each side, and for the type of Schmidt telescope referred to above 48 of these test objects are pasted upon a screen as illustrated in Fig. 4 and a suitably reduced photographic image of this screen is illuminated by transmission. For convenience, as illustrated in Fig. 4, these test objects are numbered horizontally and lettered vertically so that the resolving power of the instrument in any specified part of the field may be represented by the letter and number of the particular test object and the number of the smallest annulus resolved.

It will be apparent that these test objects may be made much larger or smaller than the size above indicated, depending on the circumstances of their use. The largest annulus preferably should be resolved by an optical system which does not quite meet specifications at the edge of the field and the smallest annulus should be smaller than the limit of the specifications at the center of the field. As many of these test objects may be used as are necessary to cover the entire field of the instrument being tested.

This pattern provides a better test of the power of an optical system to resolve heterogeneous detail than does any type of parallel line pattern and does not exhibit false focus with the annular lens. It is easy to interpret and observers agree well as to indications obtained. It is also a more severe test of the optical system and does not indicate resolving powers as high as those indicated by parallel line patterns for the reason that the false images resulting from the use of parallel line test patterns, as explained previously, are eliminated.

It will be apparent that the test objects need not be opaque annuli on a translucent background but may be translucent annuli on an opaque or black background.

It will be apparent that my test object and method of testing are not limited to use in the field of optical instruments having annular objectives but may be equally well used with practically any type of optical instrument.

I claim as my invention:

1. The method of measuring the resolving power of an optical instrument having an objective with an annular pupil, which includes establishing a test pattern comprising a plurality of annuli of graduated sizes, each of said annuli having an external diameter three times as great as its internal diameter, focusing an image of said pattern with the optical instrument, determining the angular diameter of the smallest annulus resolved by the instrument, and calculating the resolving power of the instrument as two-thirds of said angular diameter.

2. The method of testing an optical instrument having an objective with an annular pupil, whereby the occurrence of false images is avoided, comprising establishing a plurality of annular test patterns of different sizes, focussing an image of said patterns with the optical instrument, determining the angular diameter of the annular test pattern the focussed image of which is just resolved by said instrument, and calculating the resolving power of said instrument as a function of said angular diameter.

3. The method of testing an optical instrument having an annular objective with an annular pupil, whereby the occurrence of false images is avoided, comprising establishing a plurality of annular test patterns of graduated sizes, focussing an image of said patterns with the optical instrument, determining the diameter of the annular test pattern the focussed image of which is just resolved by said instrument, and utilizing the relative size of said diameter as a measure of the resolving power of the instrument.

LAWRENCE T. SACHTLEBEN.

REFERENCES CITED

The following references are of record in the file of this patent:

UNITED STATES PATENTS

| Number | Name | Date |
| --- | --- | --- |
| 2,184,920 | Bigelow | Dec. 26, 1939 |
| 1,386,663 | Twyman | Aug. 9, 1921 |